(12) United States Patent
Shaw (10) Patent No.: US 6,371,424 B1
(45) Date of Patent: Apr. 16, 2002

(54) MOUNTING AN ARTICLE UPON A SUPPORT (75) Inventor: Stephen David Shaw, Ottawa (CA)

(73) Assignee: General Dynamics Canada Ltd., Ottawa (CA)

( * ) Notice: Subject to any disclaimer, the term of this patent is extended or adjusted under 35 U.S.C. 154(b) by 0 days.

(21) Appl. No.: 09/393,892

(22) Filed: Sep. 10, 1999

(51) Int. Cl.⁷ .............................................. F16M 13/00
(52) U.S. Cl. .............................. 248/222.12; 248/187.1; 248/224.51
(58) Field of Search ........................... 248/187.1, 177.1, 248/222.12, 224.51, 224.41, 224.61, 221.11

(56) References Cited

U.S. PATENT DOCUMENTS

| | | | | |
|---|---|---|---|---|
| 1,857,050 A | * | 5/1932 | Jones | 248/224.51 |
| 2,248,410 A | * | 7/1941 | Moeller | 248/224.51 |
| 2,615,664 A | * | 10/1952 | Reeves | 248/187.1 |
| 3,579,711 A | * | 5/1971 | Nicolin | 248/221.1 |
| 3,612,462 A | * | 10/1971 | Mooney | 248/187.1 |
| 4,929,973 A | * | 5/1990 | Nakatani | 248/187.1 |
| 4,979,709 A | * | 12/1990 | Ishikneun | 248/187.1 |
| 5,058,851 A | * | 10/1991 | Lawlor | 248/223.41 |
| 5,769,365 A | * | 6/1998 | Onishi | 248/223.41 |

* cited by examiner

*Primary Examiner*—Alvin Chin-Shue
(74) *Attorney, Agent, or Firm*—Thomas Adams (57) ABSTRACT

A mounting for mounting an article onto a support comprising upper and lower mounting members. Seating surfaces provided between the members retain the members in assembled relationship with the members immovably registered together in a first plane. Three spaced mounting member registration projections provide, in the assembly, contact between the mounting members in three spaced and staggered positions on opposite sides of one of the mounting members, and registration to hold the members immovably together in a second plane. Spring-loaded locking is provided to hold the members together when assembled. Preferably the registration projections are provided on one member upon guide surfaces which are converging and inclined towards a respective seating surface. Guide surfaces on the other member are correspondingly converging and inclined. The convergence and inclination causes the projections to force the seating surfaces together to hold the members in the first plane while the projections themselves hold the members together in the second plane. One or other of the seating surfaces may have seating projections to engage the other seating surface. The invention is particularly applicable for use on weapons for withstanding sudden violent or vibrational forces and for quick release while permitting reassembly and while ensuring that settings such as calibration and boresighting settings are not altered.

11 Claims, 8 Drawing Sheets

MOUNTING AN ARTICLE UPON A SUPPORT

FIELD OF THE INVENTION

This invention relates to mountings for articles upon supports.

BACKGROUND ART

Mountings for articles upon supports are commonplace and diverse in design. However, mountings having certain specific requirements need to be of specific designs to satisfy those requirements. For instance, some mountings are required to withstand, in use, the application of forces applied either to an article or to a support without there being any change in relative orientation of the article to the support such as may be caused by loosening of the mountings or by reason of movement of one part of a mounting upon another. Particular instances of interest are where mountings are subjected to sudden violent and strong forces placed either upon the article or upon the support, such forces being, for instance, either in the form of impact forces or vibrational forces. Such forces are applied in the use of weaponry.

Weapons which depend upon being mounted upon weapon carriers or other supports should have reliable mountings for this purpose, for any change in condition of these mountings or in relative orientation of their parts, as may be brought about by such forces as referred to above, may have disastrous results for the weapon user. Similar concerns also apply to parts of weapons which are assembled together and which may be caused to loosen or come apart due to the application of sudden violent and/or vibrational forces. By way of example, grenade launching machine guns which fire relatively slow, heavy rounds necessarily require elevation of their barrels by a relatively large angle, perhaps at least 30 degrees above the sight line of the target. In order to elevate a barrel to the correct angle of elevation and also to enable it to move in azimuth to be able to fire accurately at a target, an aiming system is required.

In modern weapons, aiming systems include sight units coupled by computer to a visual display unit. There are two critical gun settings. In one setting, the aiming system needs to be calibrated. In the other setting, the aiming system needs to be "boresighted" with the gun bore for accurate alignment of the bore with the sight unit. Maintenance of calibration is primarily of importance during use of the weapon. In other words, a mounting holding the sight unit onto another part of the weapon, e.g. another part of the aiming system, must withstand sudden and extreme forces applied to it when the weapon recoils after firing, without any change in mounting condition resulting in shifting the position of the sight unit. It is also necessary to maintain the critical settings upon reinstallation of the sight unit after removal of the sight unit from the gun for transportation purposes.

Hence, a great deal of reliance must be placed upon a mounting for connecting the sight unit. It is known, however, that in existing mountings for this type of purpose, loosening of the mounting parts may result during firing. Also, after removal of a sight unit, it is possible for foreign matter such as dust particles to be present between mating parts of the mounting which, upon reassembly, prevent intimate mating of mounting parts, thereby resulting in inaccuracy in repositioning of the sight unit. Inaccurate firing of the weapon will then result.

Mountings which may be subjected to sudden forces, such as may occur during movement of an assembly of other articles upon supports are also known. Such articles include video cameras and theodolites which are continually moved, laid to rest in awkward positions, or transported about, whereby their mountings may suffer indeterminate forces from diverse directions.

SUMMARY OF THE INVENTION

The invention seeks to provide a mounting for mounting an article upon a support so that positional orientation of the article remains substantially unchanged when the assembly of article and support is subjected to forces in use and also positional orientation of the article upon its support is replicated when the article is remounted thereon after its removal.

Accordingly, the present invention provides a mounting for mounting an article upon a support comprising first and second mounting members which are relatively movable into assembled relationship in which the second mounting member is held in a seating position by the first mounting member, each mounting member having a seating means, and the seating means of the two members lie in abutting relationship with the second mounting member immovably registered in a first plane relative to the first mounting member when the second mounting member is in the seating position, the mounting also comprising three spaced mounting member registration projections which are located to provide, in the seating position, contact between the mounting members in a three spaced position and staggered relationship from side to side of the second mounting member to register the second mounting member in a second plane relative to the first mounting member, the registration projections providing wiping action between the mounting members during their movement into assembled relationship; the mounting further comprising means for locking the mounting members together with the second mounting member remaining in the seating position.

In a preferred arrangement of the invention, the first mounting member has a receiving channel for receiving the second mounting member during assembly of the mounting members. This receiving channel has edges defining a first pair of guide surfaces. A second pair of guide surfaces on the opposite sides of the second mounting member confront the first pair of guide surfaces during assembly. Each projection is provided as part of a respective one of the guide surfaces. Hence, the registration projections may be provided on both of the guide surfaces of one or the other pair of guide surfaces. Alternatively one projection may be provided upon one mounting member and the other two projections upon the other mounting member.

It is envisaged that the three registration projections may simply register the second member in its second plane according to the invention. However, in a preferred arrangement, the registration projections serve also to immovably register the second mounting member in the first plane relative to the first mounting member. In this preferred arrangement, the guide surfaces of the first pair are inclined, in a lateral direction, towards the seating means of the first mounting member and these guide surfaces are convergent along their length. The second pair of guide surfaces are correspondingly inclined and convergent. Hence, during assembly of the two mounting members, the guide surfaces of one pair move longitudinally and, because of the convergence, also laterally of the guide surfaces of the other pair. This movement brings the second mounting member into the seating position in which each projection of a guide surface abuts against an opposing guide surface. This action forces the seating means against one another to provide the immovable registration discussed above.

The locking means is preferably designed for quick release so as to enable rapid disconnection of the two mounting members and thus of the article from the support on which it is carried. For this purpose the locking means preferably comprises a plurality of locking arms, namely two, carried by one of the mounting members, each arm being spring-urged about a pivot to move it into a position of locking engagement with the other mounting member when the two mounting members are in assembled relationship. In order to overcome the possibility of repeated operation of sudden accelerations inadvertently causing disengagement of one or other of the locking arms from its locking position, each arm is balanced about its pivotal axis so that the mass of the arm on one side of the pivotal axis is substantially equal to the mass on the other side.

Preferably, each of the arms has a detent surface to engage said other of the mounting members and the geometry of the detent surface, arm and its pivots preferably are determined so that forces acting to separate the two mounting members are less than friction forces between the detent surface and said other of the mounting members.

According to a further aspect of the present invention, a mounting for an article upon a support comprises first and second mounting members for attachment one mounting member to the article and the other to the support, the mounting members being relatively movable into assembled relationship in which the second mounted member is held in a seating position by the first mounting member, the mounting also including means for locking the second mounting member in its seating position, the locking means comprising a plurality of locking arms which are pivotally connected to the first mounting member, each locking arm being resiliently moved towards a locking position in locking engagement with a respective one of opposite sides of the second mounting member, each locking arm having its mass balanced about its pivotal axis.

According to yet another aspect of the invention, a mounting for mounting an article upon a support comprises first and second mounting members which are relatively movable into assembled relationship in which the second mounting member is held in a seating position by the first mounting member, each mounting member having a seating means with the seating means of the two mounting members lying in abutting relationship with the second mounting member immovably registered in a first plane relative to the first mounting member when the second mounting member is in the seating position, wherein the first mounting member has a receiving channel for receiving the second mounting member during assembly of the mounting members, the receiving channel having edges defined by a first pair of guide surfaces, a second pair of guide surfaces being provided on opposite sides of the second mounting member to confront and move along the first pair of guide surfaces during assembly, and each registration projection is provided as part of a respective one of the guide surfaces; and means for locking the mounting members together with the second mounting member in the seated position.

BRIEF DESCRIPTION OF THE DRAWINGS

One embodiment of the invention will now be described, by way of example, with reference to the accompanying drawings, in which.

DESCRIPTION OF THE EMBODIMENT

Figure 1:
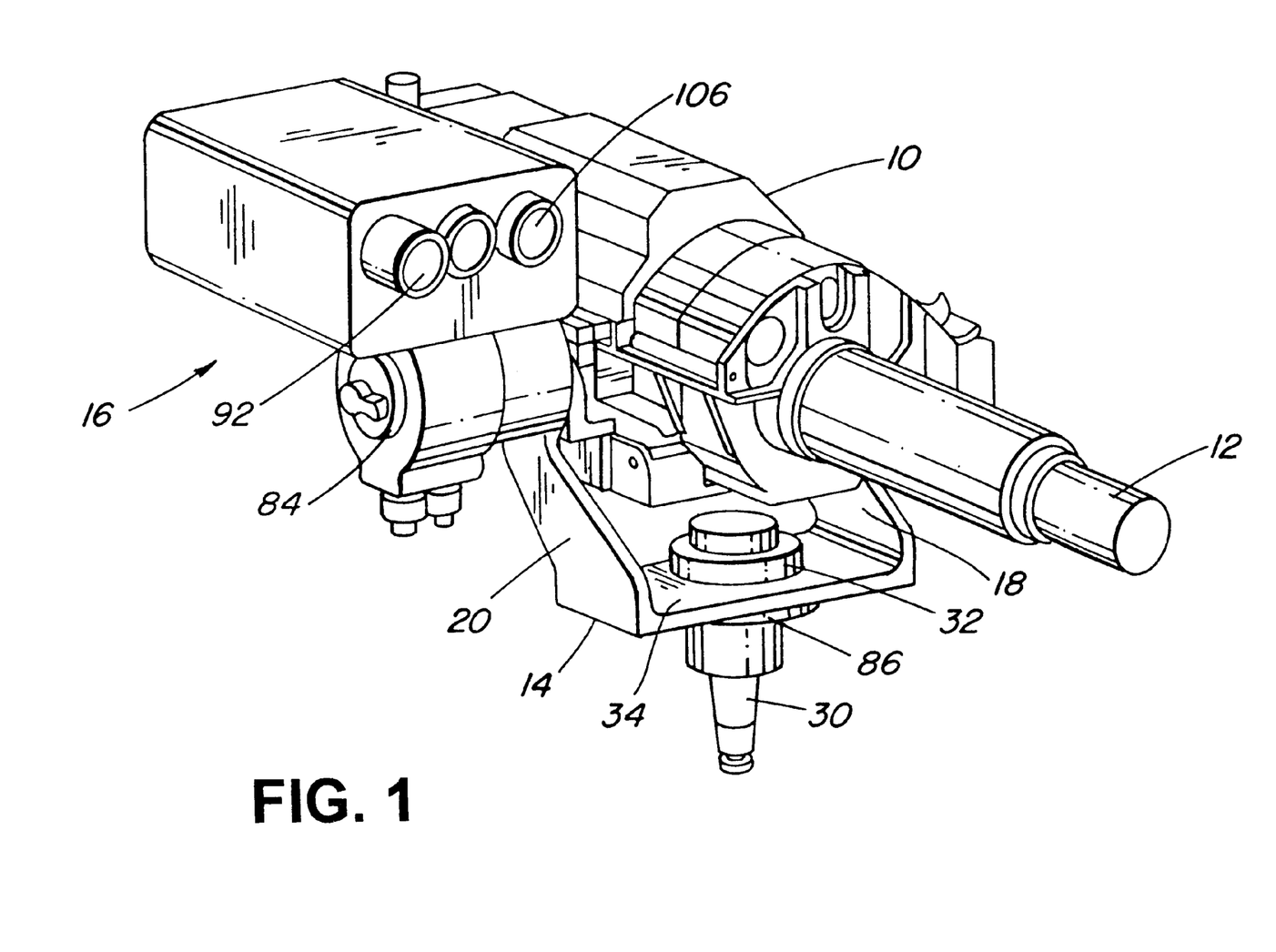
FIG. 1 is a front perspective view of a grenade machine gun according to the embodiment.
Figure 2:
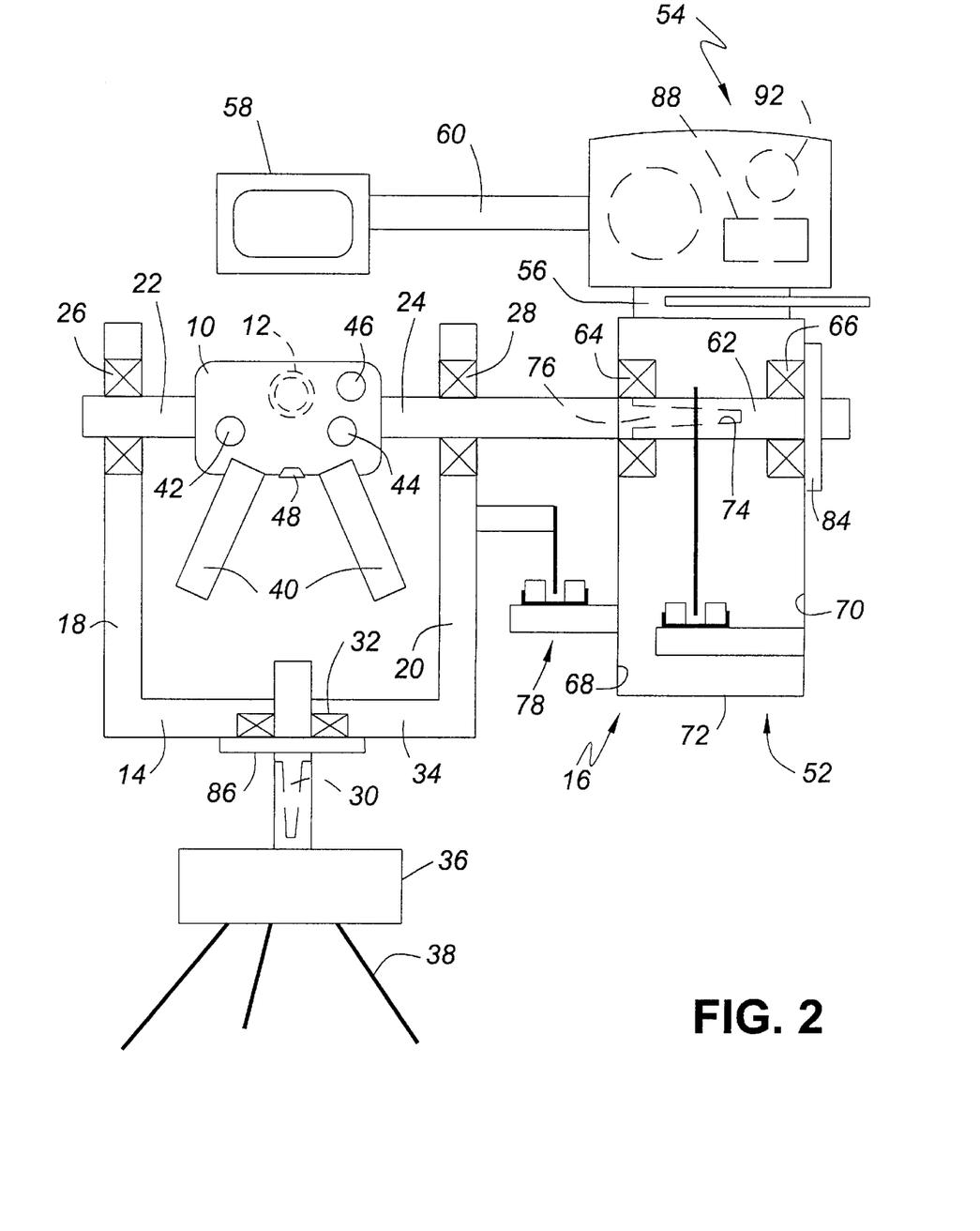
FIG. 2 is a schematic view of the rear of the machine gun.
Figure 3:
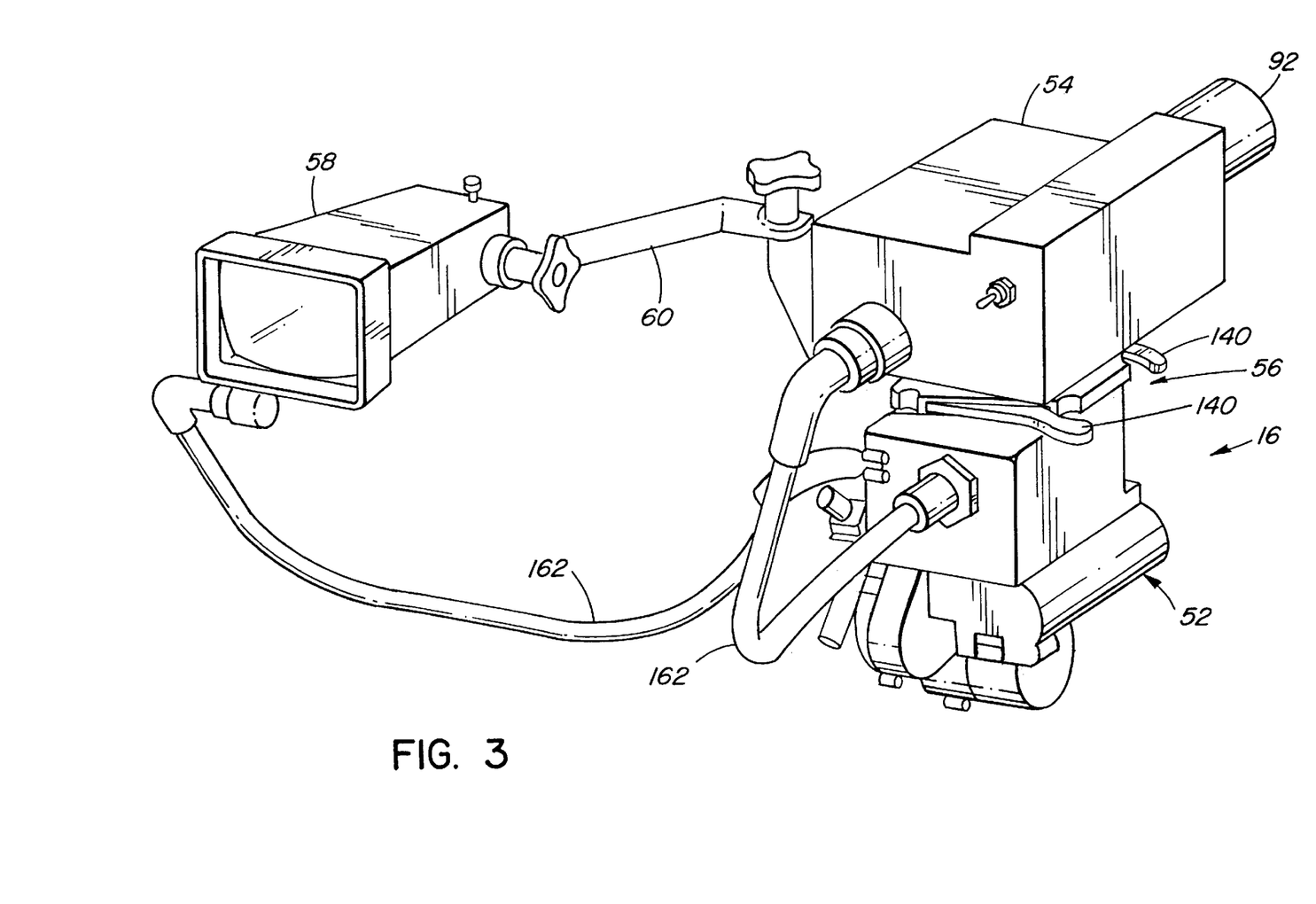
FIG. 3 is a rear perspective view of an aiming system of the machine gun.

With reference to FIGS. 1, 2 and 3, a weapon embodying the invention, specifically a grenade machine gun, comprises a weapon body 10 having a barrel 12 mounted in a cradle mount 14, with an aiming system 16 mounted to one side of the cradle mount 14. The cradle mount 14 has upstanding arms 18 and 20 extending one from each side of the weapon body 10. Journals 22 and 24 (see FIG. 2) project from opposite sides of the weapon body 10 and into bearings 26 and 28 in arms 18 and 20, respectively, permitting the weapon to pivot in elevation relative to the cradle mount 14.

A tapered pintle 30 fixedly secured in a central base unit 36 of a tripod 38 projects upwards through a bearing 32 in a bight portion 34 of cradle mount 14. Hence, the cradle mount 24 can rotate in azimuth relative to the tripod 38. Handles 40 at the rear end of the weapon body 10 allow the user to pivot the barrel in elevation and azimuth. Three control buttons 42, 44 and 46, are disposed adjacent the handles 40 so that they can be operated by the user. A trigger 48 is positioned between the two handles 40.

The aiming system 16 comprises a coupling unit 52 and a sight unit 54 which is supported upon the coupling unit 52 by a mounting 56 which is to be described in detail below. A display unit 58 is mounted upon the sight unit 54 by means of a rearwardly extending support arm 60 (not shown in FIG. 1—see FIGS. 2 and 3) so that the display unit 58 is immediately above the rear portion of the weapon body 10. The support arm 60 may also carry electrical connections (not shown). A support shaft 62 extends through bearings 64 and 66 in opposite side walls 68 and 70, respectively, of a housing 72 of the coupling unit 52. The end portion of shaft 62 supported by the bearing 64 has a tapered hole 74 to driveably receive a mating tapered end portion 76 of journal 24 which projects beyond bearing 28 and cradle mount 14.

The shaft 62 thus constitutes a first part of the coupling unit that is connected to the weapon for movement in elevation with the barrel 12. For more details, the reader is directed to copending U.S. patent application Ser. No. 09/378,710 the contents of which are incorporated herein by reference.

For purposes of the present invention, further details of this embodiment of the machine gun construction, apart from anything relevant to the mounting 56, need be mentioned only briefly.

Hence, briefly, a clutch unit 78 acts between coupling unit 52 and cradle mount 14. Actuation of clutch unit 78 locks the coupling unit 52 and hence the sight unit 54 to the cradle mount 14.

A second clutch unit 80, inside coupling unit 52, acts upon actuation to lock the coupling unit 52 and the sight unit 54 to the shaft 62 and hence to the weapon body 10.

The clutch units 78 and 80 are operable alternatively of one another, by the push button 42 which is a changeover switch. Engagement of clutch unit 80 locks the housing 72 to the weapon body 10 and so it can pivot in elevation relative to the cradle mount 14, the elevation angle being measured by an angle decoder, i.e. a resolver 84, mounted around bearing 66 to measure angular displacement between the housing 72 and the shaft 62. Engagement of clutch unit 78 locks the housing 72 to the cradle mount 14 while the housing 72 is released from the shaft 62. Consequently the weapon body 10 and barrel 12 can pivot in elevation independently of the aiming system 16 and the sight unit 54.

At all times, however, the aiming system 16 will rotate with the weapon body 10 in azimuth as cradle mount 14 rotates about bearing 32. The azimuthal rotation is measured by a second resolver 86 mounted around the bearing 32, for providing a signal representing rotation of cradle mount 14 about pintle 30 which is fixed to the tripod 38.

It is essential to enable consistent and accurate firing of the gun at a target. Thus, it is necessary to accurately position various essential parts of the machine gun and to ensure that they cooperate correctly. For this purpose, the sight unit 54 is coupled by control computer 88 (FIG. 2) to the display unit 58. The aiming system is calibrated in the factory and is installed onto the weapon afterwards, usually "in the field". Once the sight unit 54 has been installed onto the weapon by engaging the tapered portion 76 of the journal 24 in the hole 74 in the shaft 62, it must be "boresighted". A boresighting device displaying an aiming point marker (not shown) is placed into the barrel 12 and the position of an aiming reticle (not shown) generated by the control computer 88 and displayed by display 58, represents, as is conventional, is adjusted to set a zero-range aiming point or zero-range ballistic solution. Subsequently, the position of the aiming reticle will be adjusted by the control computer 88 to give the required offset for superelevation and other factors in the ballistic solution. It should be noted that a rangefinder reticle (not shown) will not be coincident with the aiming reticle in the displayed image, reflecting the fact that the sight line of the rangefinder is offset relative to the sight line of an imaging device 92.

After the above procedure, it becomes critical to ensure that boresighting and calibration remain unchanged to enable the gun to fire accurately at targets. The gun is constructed with the intention of enabling removal of the sight unit 54 and the display unit 58 as a single entity for transportation purposes, this single unit then being again reassembled onto the gun before use. It is essential that, when the sight unit and display unit 58 are returned onto the gun, they return accurately to their positions occupied before removal so as to ensure accuracy in returning to the previously set boresighting and calibration of the aiming system 16. It is also essential that sudden impact loadings placed upon the gun, which may be repetitive for machine gun operation, should not alter the set calibration or boresighting. In addition, any vibrational loadings should also have no effect. The mounting 56, now to be described, advantageously ensures accuracy in relocation of the sight unit 54 and the display unit 58 and also prevents movement of these units upon the coupling unit 52 in use.

Figure 4:
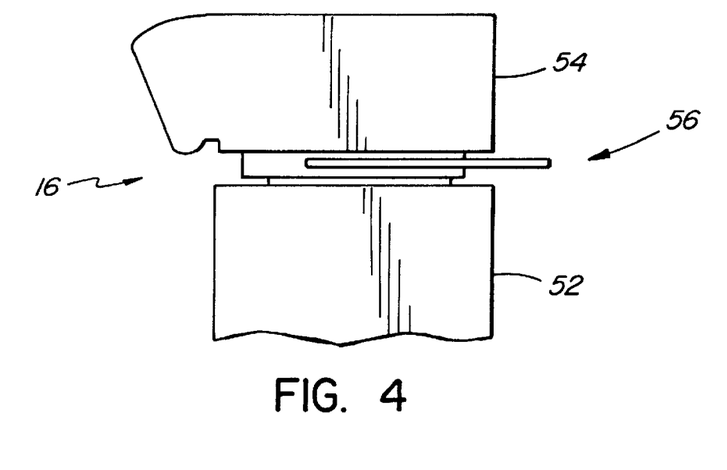
FIG. 4 is a rear elevational view of part of the aiming system and showing a mounting included in the aiming system.

As shown by FIGS. 4 onwards, the mounting 56 comprises two mounting members, namely upper mounting member 100 which is fixedly secured underneath the base of the sight unit 54, and a lower mounting member 102 which is fixedly secured to the upper surface of the coupling unit 52.

As shown by FIGS. 5, 6, 7 and 8, in particular, the upper mounting member 100 comprises a planar base 104, by which it is secured to the sight unit 54, and two flanges 106 depending downwardly from side edges of the base 104. The flanges 106 converge towards each other so that the base in plan view has a frusto-pyramidal appearance. An under planar surface 108 of the base 104 is a seating surface which provides seating means of the upper mounting member which, in conjunction with seating means of the lower mounting member (as will be described) relatively locates the mounting members together in a horizontal plane. As shown particularly by FIG. 8, the flanges 106 turn inwardly towards each other at their free ends to provide oppositely inclined guide surfaces 110 for guiding reception of the lower mounting member 102. These guide surfaces 110 are thus inclined laterally towards the seating surface 108 and are separated therefrom by short vertical surfaces 112. The guide surfaces 110, surfaces 112 and the seating surface 108 define a receiving channel 114. This is for receiving the lower mounting member. The flanges 106 and thus the guide surfaces 110 converge away from an entrance 116 for receiving the lower mounting member and which is defined at the widest part of the chamber 114.

Figure 6:
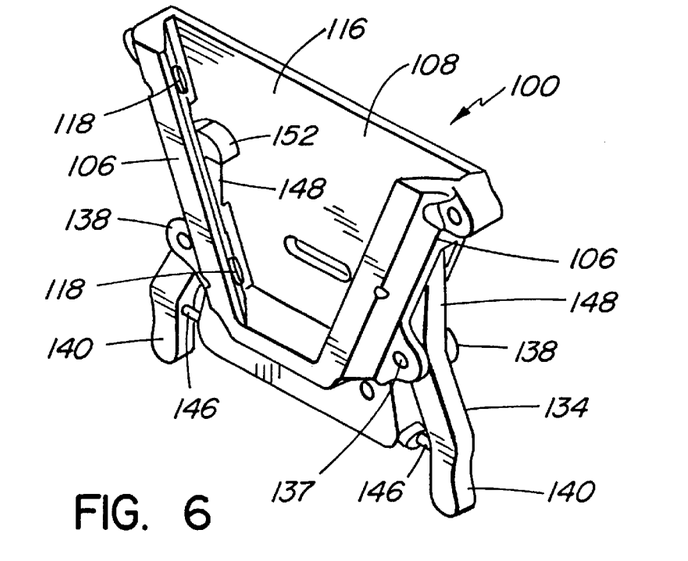
FIG. 6 is a perspective view of the underside of an upper mounting member of the mounting.
Figure 7:
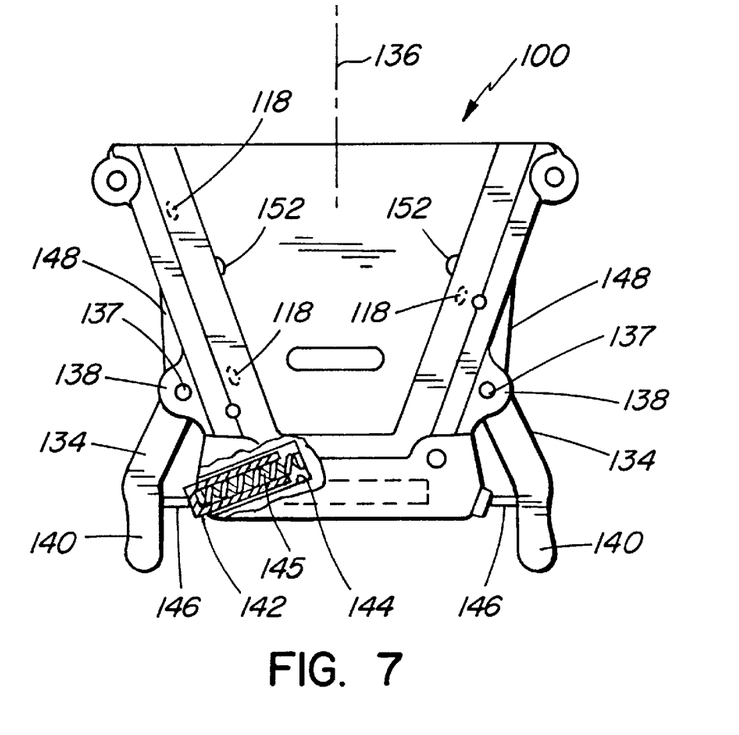
FIG. 7 is an underside plan view of the upper mounting member.
Figure 8:
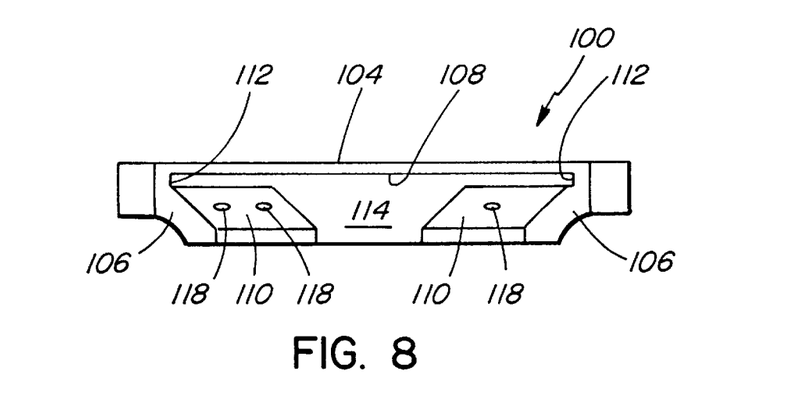
FIG. 8 is an end view of the upper mounting member in the direction of arrow VIII in FIG. 5.

The upper mounting member 100 also includes three mounting member registration projections 118 which are located to provide, in a seating position of the lower mounting member within the upper mounting member, discrete contact in three spaced positions lying in staggered relationship from side to side of the lower mounting member. As shown in FIGS. 6, 7 and 8, these three projections 118 are provided upon the two guide surfaces 110. One of the guide surfaces 110 is formed with two of the projections 118, one projection lying towards the entrance 116 and the other projection lying towards a closed end 119 of the receiving channel 114. The other projection 118 is formed as part of the other guide surface 110 in a position substantially midway between the other two projections 118 from the entrance 116 to the channel. Hence, as already stated, the projections are staggered down the length of the channel, from side to side of the channel.

Figure 9:
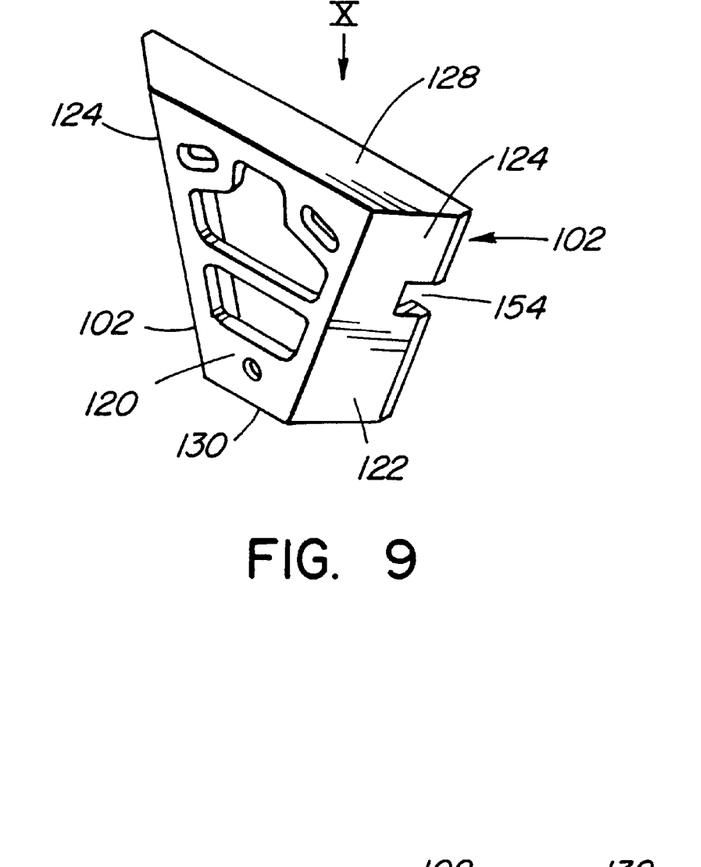
FIG. 9 is an isometric view of the underside of a lower mounting member of the mounting.
Figure 10:
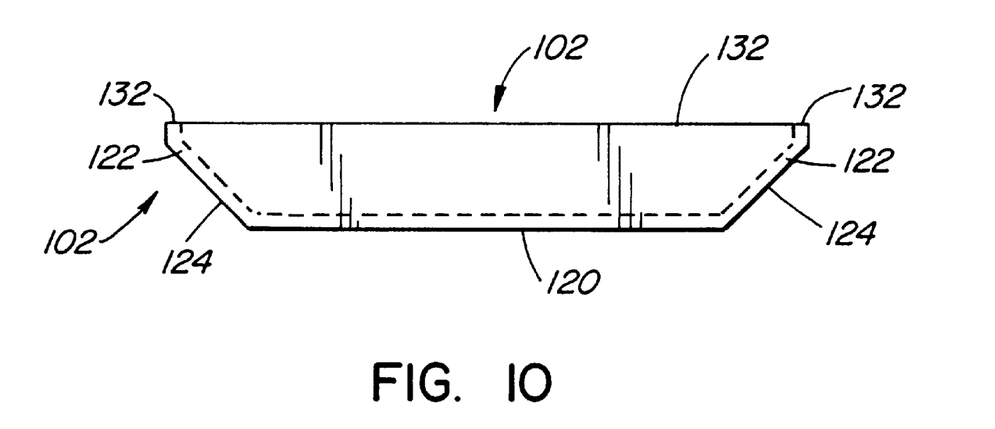
FIG. 10 is an end view of the lower mounting member in the direction of arrow X in FIG. 9.

As shown by FIGS. 9 and 10, the lower mounting member 102 has a base 120 by which it is secured to the coupling unit 52. Upwardly extending flanges 122 flare outwardly from the base 120. These flanges have outer guide surfaces 124 which are inclined outwardly complementary in angle to the lateral inclination of the two guide surfaces 110 of the upper mounting member. The flanges 122 also converge from an end wall 128 at a wide end of the mounting member with the angle of convergence corresponding to the convergence angle of the guide surfaces 110. As may be seen from FIGS. 9 and 10, the lower mounting member 102 is basically dish-shaped and also has an end wall 130 at its narrower end. The lower mounting member is conveniently formed by casting or machining from a single piece.

The lower mounting member also has seating means which comprises coplanar end seating surfaces 132 of the flanges 122 and of the end walls 128, 130. These seating surfaces are for abutting engagement with the seating surface 108 upon assembly of the mounting members as will be described.

The mounting also comprises means for urging the two mounting members into and to remain in assembled relationship with the lower mounting member 102 in a seating position. This urging means comprises two locking arms 134 (FIGS. 5, 7 and 8) located one at each side of the upper mounting member 100 in identical positions symmetrically one on each side of a centre line 136 of the upper mounting member. Each locking arm is pivoted at a position intermediate its ends by a pivot pin 137 received through mounting lugs 138 extending outwards from an associated flange 106. A projecting end region 140 of each locking arm 134 is biased outwardly from the upper mounting member 100 by a hollow piston 142 which is housed within a cylinder 144 and urged outwards by a compression spring 145 within the piston 142. A short operating rod 146 having one end secured to the end region 140 of the locking arm 134 extends to contact at its other end the head of piston 142. Outward movement of the end region 140 of the locking arm causes movement of the other end region 148 of the locking arm on the other side of the pivot pin 137 inwardly into the receiving channel 114. The other end region 148 of each arm extends through a receiving slot 150 (FIGS. 5, 7, 11 and 12) of the upper mounting member 100 with a latch end 152 of the locking arm extending into the receiving chamber. In the position shown in FIGS. 5, 6, 7, 11 and 12, each locking arm is held in a locking position in which the latch end 152 engages within an associated slot 154 (FIGS. 9, 11 and 12) formed in one of the flanges 122 of the lower mounting member 102, when the two mounting members are in their assembled positions. For reasons of clarity of the description, FIGS. 11 and 12 represent the mounting parts from beneath to more clearly indicate their relationship.

Figure 11:
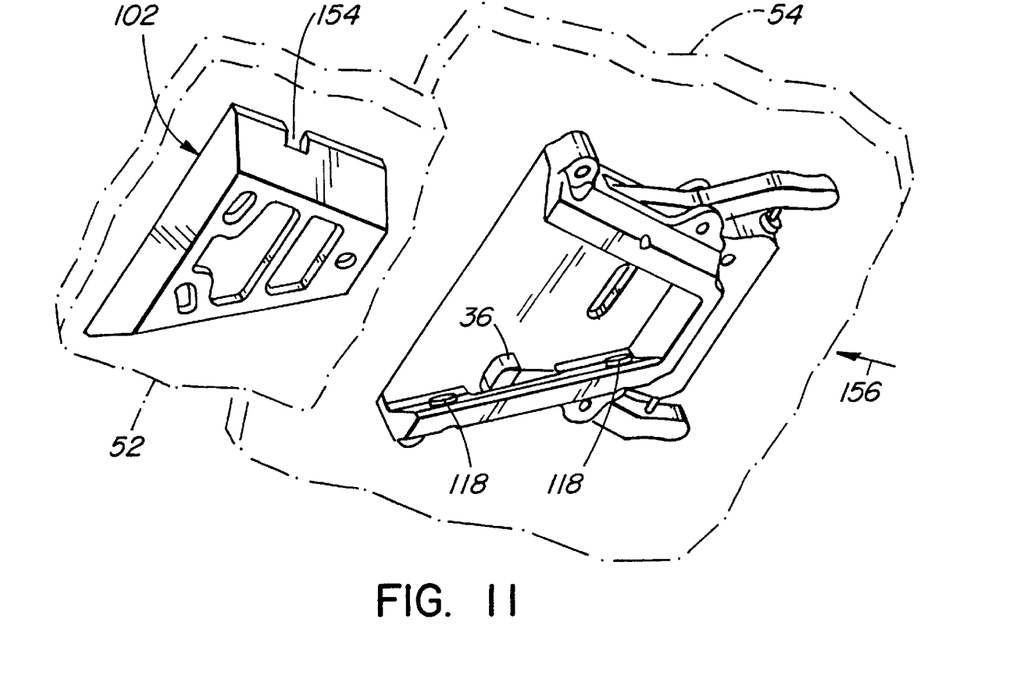
FIGS. 11 and 12 are underside isometric views of the mounting members and showing different positions of the members during assembly.

To assemble the sight unit 54 onto the coupling unit 52, the sight unit is manually positioned over the coupling unit with the mounting members aligned (FIG. 11). The upper mounting member is slid laterally (in a right to left direction in FIGS. 2 and 3) over the lower mounting member so that the narrow end of the lower mounting member is received into the entrance 116 to the receiving channel 114. Continued movement in the direction of arrow 156 in FIGS. 11 and 12 is accompanied by sliding contact movement between the seating surface 108 of the upper mounting member and the seating surface provided by the flanges 122 as shown in FIG. 13. As the two members are slid together, the force acting between the inclined guide surfaces 110 brings the seating surfaces into engagement.

Figure 5:
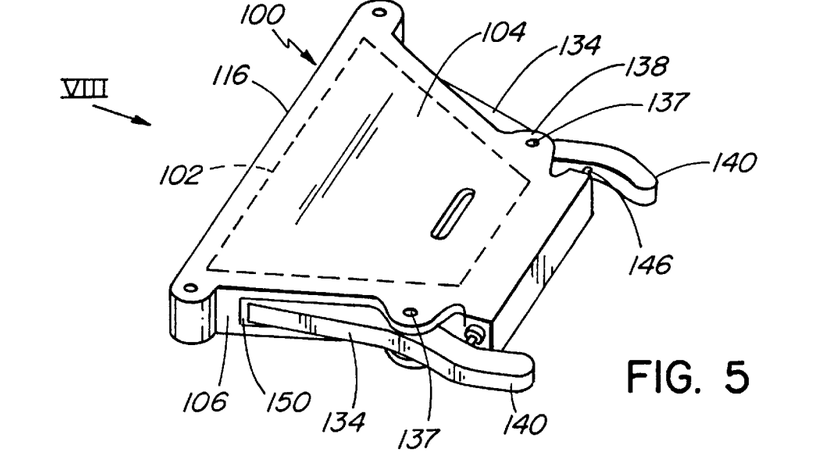
FIG. 5 is a top isometric view of the mounting of FIG. 4 in assembled position.
Figure 12:
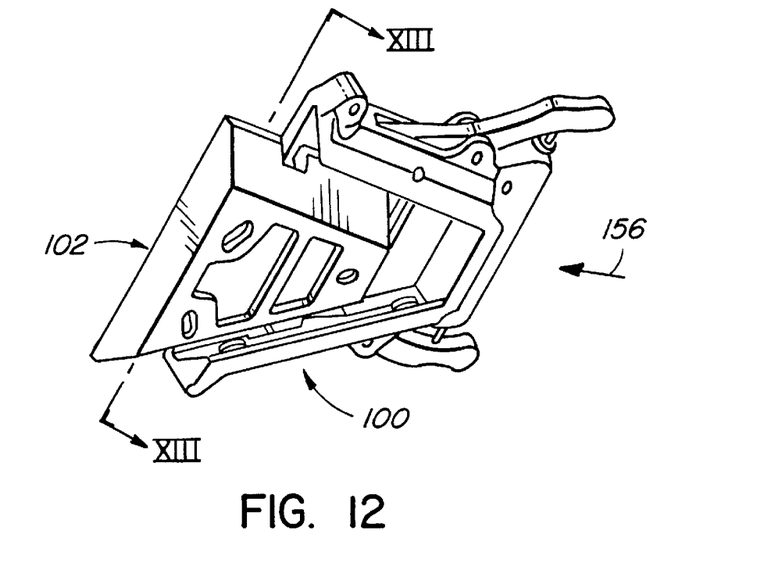
Figure 13:
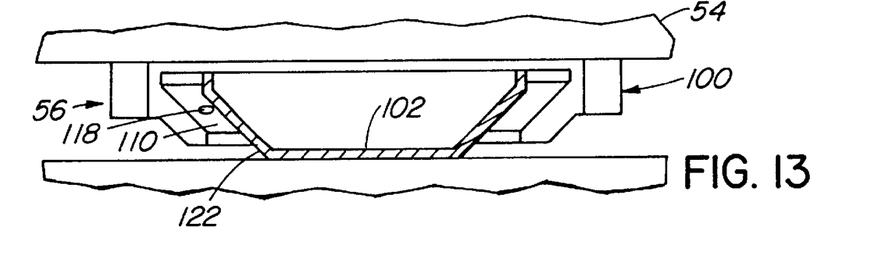
FIG. 13 is a cross-sectional view of a partial assembly of the mounting members taken along line XIII—XIII in FIG. 12.
Figure 14:
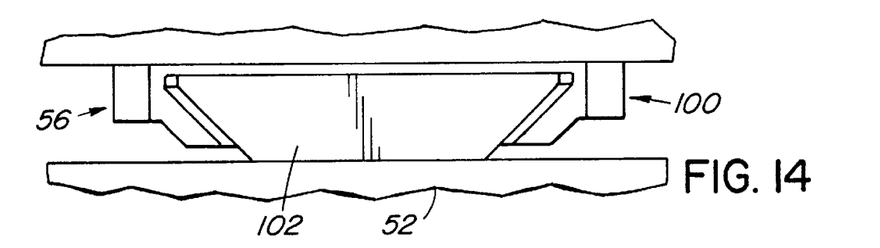
FIG. 14 is a view of the finished assembly of the mounting in the direction of arrow VIII in FIG. 5.

It will be noticed from FIG. 12 and especially from FIG. 13, that as the mounting members 100 and 102 move towards their assembled positions, the guide surfaces 110 of the upper mounting member are spaced away from the guide surfaces 124 of the lower mounting member because of the convergence of the surfaces of each pair. However, as movement towards assembly of the members proceeds, each surface 110 moves longitudinally and laterally of a respective surface 124. Towards the end of the movement, each surface 110 directly faces its respective surface 124 and the projections 118 on the surfaces 110 engage the surfaces 124. This engagement takes place directly before the lower mounting member 102 is in its seating position effects a wiping action of the projections 118 upon the surfaces 124. The wiping action displaces any particles of dust or other foreign matter from these surfaces and also from the projections themselves. As a result, clean parts of the surfaces 124 are engaged in the assembled position by clean parts of the projections 118. In addition, towards the end of movement of the mounting members together, the engagement of the projections 118 upon the surfaces 124 applies an upward force to the lower mounting member 102 which results in engagement between the seating surface 108 of the upper mounting member and the seating surfaces 132 of the lower mounting member. FIGS. 5 and 14 show the mounting member 102 in its seating position.

Figure 15:
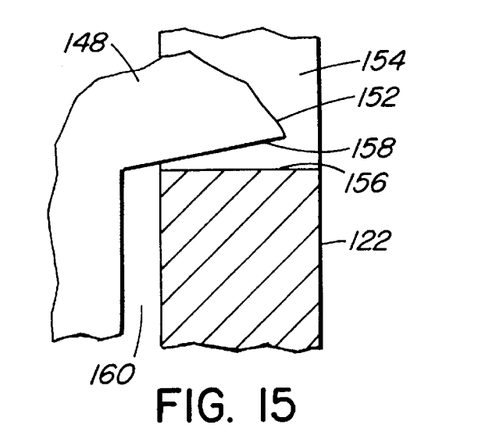
FIG. 15 is a scrap view, partly in cross-section and to a much larger scale showing a locking arm in a locking position to hold the mounting members together.

During assembly of the two mounting members, initially the locking arms 134 are in their locking positions as shown in FIGS. 6, 7, 11 and 12. However, as the lower mounting member 102 moves progressively into the receiving channel, the flanges 124 engage the latch ends 152 of the locking arms. The divergence of the surfaces 124 towards the trailing end of the lower mounting member then forces the latching ends 152 of the locking arms apart. Finally, when the upper mounting member has moved to bring the lower mounting member into its seating position in the receiving channel, the latch ends 152 of the locking arms 134 become aligned with the slots 154 in the flanges 122 and the compression springs 142 acting upon the locking arms force them to return to their locking positions. This results in entry of the latch ends 152 into the slots 154, as is shown particularly by FIG. 15. In this position of each latch end, the compression springs continue to urge the two locking members together so as to retain the lower member in its seating position.

The configuration and dimensioning of each latch end 152 and its associated slot, and the position of the pivot axis, ensure that, when the gun is in use, any component of recoil force which could tend to drive the locking arms outwards from their locking positions, is less than the effect of to friction between, for example, the latch end 152 and the associated slot, and, of course, the action of the spring 145, which tend to resist outward movement of the locking arm and keep it in the locked position. A slight gap 160 must exist between the arm end region 148 and the outer face of the corresponding flange 122 to ensure that the contact between locking arm and the flange 122 exists solely between the surfaces 156 and 158. Latch forces are thus applied between the locking arms and the inner mounting member only in a direction to hold the mounting members in assembled position. Also, the angle of the face 158 of the latch end is important. In the specific embodiment described herein, the face 158 was almost, but not quite, perpendicular to a line joining the pivot 137 and the outer corner of the surface 156 of the slot, i.e. where the latch end contacts the slot. It was found that, for a friction coefficient of 0.15, the angle between the face 158 and the line joining the pivot 137 to the corner could be up to about 99 degrees without recoil forces causing the arms to disengage. Lower angles would increase the friction force but make manufacturing tolerances tighter. It is envisaged that an angle of about 97.5 degrees will give the best performance.

In addition to this, each of the locking arms 134 is balanced on each side of its pivot pin 137. This provision in which the mass of the arm on one side of the pivot axis substantially equals the mass of the arm on the other side, overcomes any problem which could exist when recoil forces in use of the gun act upon each arm about its pivot position, with any possible tendency to dislodge it from its locking position.

It follows that when the sight unit 54 has been assembled onto the coupling unit 52 as described above, the projections 118 acting at the angles of inclination of the guide surfaces 110, perform two functions. In one of these functions the projections 118 urge the seating surfaces 108 and 132 together as discussed above so as to hold the lower mounting member 102 in a specific horizontal plane relative to the upper mounting member 100. Further to this, the projections 118 acting on opposite sides of the lower mounting member and upon the guide surfaces 124 locate and hold the mounting members together with the lower mounting member in a specific vertical plane relative to the upper mounting member. As a result, and with the locking arms 134 holding the mounting members in assembled relationship, as described above, relative movement of the two members is impossible even during repeated firing and the application of recoil forces to the mounting. Hence, the calibration of the aiming system remains as previously set and no variation in the boresighting can occur.

As may be seen from the Figures, the end regions 140 of the locking arms 134 project outwards so as to be readily accessible for manual operation. This is also shown, for instance, by FIG. 3 in which it can be seen that the ends 140 may be gripped and moved towards each other against spring action in order to remove the locking arms from their locking positions. This action provides a quick release of the sight unit 54 and accompanying visual display after a single cable 162 (FIG. 3) has been quickly disconnected from between the sight unit and the mount. This provides partial dismantling of the weapon system for transporting or for storage purposes.

The design of the mounting 56 is such that should it be required to reassemble the sight unit 54 and display unit 58 onto the coupling unit 52, the mounting assures that the sight unit will occupy substantially the same position which it occupied before removal. This is partly because the seating surfaces 108 and 132 locate the sight unit in exactly the same horizontal plane as it occupied before removal. In addition, any foreign matter such as dust or other particles which are present upon the surfaces 124, and which could interfere with correct seating against the projections 118, tends to be wiped away from the surfaces 124 as the projections move across the surfaces 124 towards the end of the assembly movement. The lower mounting member is thus also disposed in exactly the same vertical plane relative to the upper mounting member which it occupied before removal.

The mounting of the embodiment thus ensures that the sight unit and accompanying display unit may be removed from the gun and replaced as required without any problem arising concerning boresighting and calibration settings.

Figure 16:
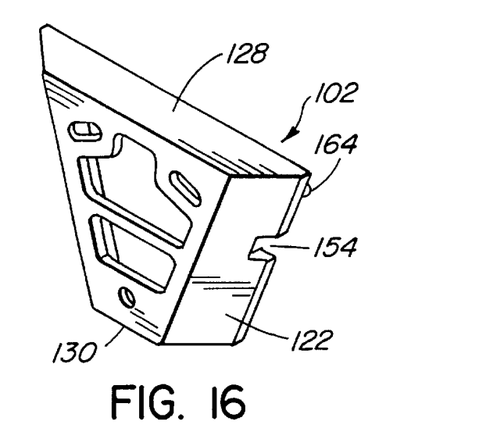
FIG. 16 is a view similar to FIG. 9 of a modification to the embodiment.
Figure 17:
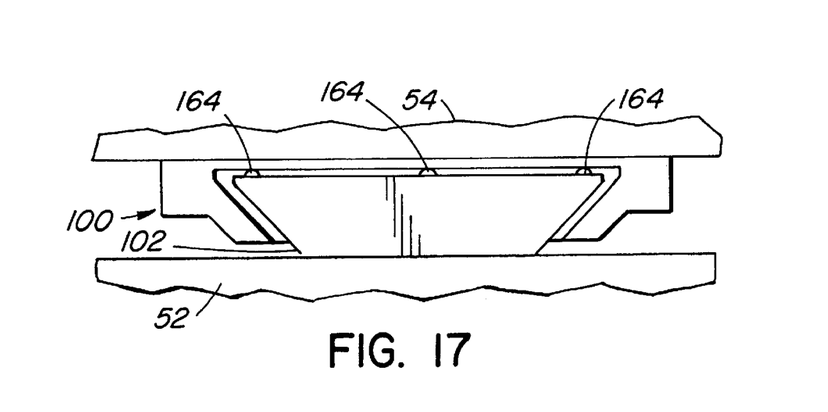
FIG. 17 is a view similar to FIG. 14 of the modification.

In a modification of the embodiment described above, and as shown in FIGS. 16 and 17, the seating surfaces 132 of lower mounting member 102 are each formed with a seating projection 164 for engagement with the seating surface 108 of the upper mounting member. These projections 164 are adjacent the end wall 128. A third projection 164 is provided upon the free edge of end wall 130, at its middle (see FIG. 17). During movement of the two mounting members into assembled relationship, these seating projections 164 slide in contact with the seating surface 108 to perform a cleaning action upon the seating surface 108 and remove dust particles or other foreign matter. In the assembled position (FIG. 17) of the two mounting members there is thus a six point bearing contact between the mounting members. At three of these points, the registration projections 118 bear upwardly against the lower mounting member to locate the lower mounting member in its vertical plane. The projections 118 also urge the three seating projections 164 at the other three points into compressive engagement against the seating surface 108 for locating the lower mounting member in the fixed horizontal plane relative to the upper mounting member. Providing there is not excessive dirt on the surfaces, the wiping action of projections 118 and 164 during the first few firings of the gun helps to ensure that the mounting members are always reassembled in exactly their same relative positions after they have been disassembled.

It is envisaged that the corner of slot 154 between the surface 156 and the outer surface of member 102 could be chamfered at about the same angle as face 158, i.e. so that the chamfer is substantially parallel to face 158, so as to distribute the forces at that point.

What is claimed is:

1. A mounting for mounting an article upon a support comprising:

first and second mounting members which are relatively movable into assembled relationship in which the second mounting member is held in a seating position by the first mounting member, each mounting member having a seating means, the seating means of the two mounting members lying in abutting relationship with the second mounting member immovably registered in a first plane relative to the first mounting member when the second mounting member is in the seating position, the mounting also comprising three spaced mounting member registration projections which are located to provide, in the seating position, contact between the mounting members in a three spaced position and staggered relationship from side to side of the second mounting member to register the second mounting member in a second plane relative to the first mounting member, the registration projections providing wiping action between the mounting members during their movement into assembled relationship; and means for locking the mounting members together with the second mounting member remaining in the seating position, wherein the locking means comprises a plurality of locking arms carried by one of the mounting members, each arm being spring-urged to move it into a position of locking engagement with the other mounting member when the second mounting member is in its seating position, and wherein there are two locking arms carried by the first mounting member and pivotable about pivot axes, respectively, to engage opposing sides of the second mounting member when the second mounting member is in its seating position.

2. A mounting according to claim 1, wherein each locking arm is engageable within a respective slot defined in the second mounting member to engage a side of the slot and hold the second mounting member in its seating position.

3. A mounting according to claim 2, wherein the locking arms are quickly releasable by manual operation out of their locking positions.

4. A mounting for mounting an article upon a support comprising:

first and second mounting members which are relatively movable into assembled relationship in which the second mounting member is held in a seating position by the first mounting member, each mounting member having a seating means, the seating means of the two mounting members lying in abutting relationship with the second mounting member immovably registered in a first plane relative to the first mounting member when the second mounting member is in the seating position, the mounting also comprising three spaced mounting member registration projections which are located to provide, in the seating position, contact between the mounting members in a three spaced position and staggered relationship from side to side of the second mounting member to register the second mounting member in a second plane relative to the first mounting member, the registration projections providing wiping action between the mounting members during their movement into assembled relationship; and means for locking the mounting members together with the second mounting member remaining in the seating position, wherein the locking means comprises two locking arms carried by the first mounting member and pivotable about pivot axes, respectively, each locking arm being spring-urged into a position of locking engagement with the second mounting member when the second mounting member is in its seating position, each locking arm being engagable in a respective slot defined in the second mounting member to engage a side of the slot and hold the second mounting member in its seating position, each locking arm has a latch end portion for engaging said side of the slot and the configuration and dimensioning of each latch end portion and its associated slot, and the position of the pivot axis, are such that, in use, any component of force tending to move the locking arm outwards from its locking position resulting from a force acting parallel to a direction of said movement into assembled relationship is less than the effect of friction between the latch end portion and the associated slot side and the action of the spring.

5. A mounting according to claim 4, wherein a face of the latch end portion disposed to contact said side of the slot to retain the members in the locked position is inclined at an angle of up to 99 degrees to a line joining the pivot to a corner of the slot side adjacent the latch end portion.

6. A mounting according to claim 5, wherein said angle is about 97.5 degrees.

7. A mounting according to claim 4, wherein the spring-urging of the locking arms is provided by compression springs.

8. A mounting for mounting an article upon a support comprising:

first and second mounting members which are relatively movable into assembled relationship in which the second mounting member is held in a seating position by the first mounting member, each mounting member having a seating means, the seating means of the two mounting members lying in abutting relationship with the second mounting member immovably registered in a first plane relative to the first mounting member when the second mounting member is in the seating positon, the mounting also comprising three spaced mounting member registration projections which are located to provide, in the seating position, contact between the mounting members in a three spaced position and staggered relationship from side to side of the second mounting member to register the second mounting member in a second plane relative to the first mounting member, the registration projections providing wiping action between the mounting members during their movement into assembled relationship; and means for locking the mounting members together with the second mounting member remaining in the seating position, wherein the locking means comprises a plurality of locking arms carried by one of the mounting members, each arm being spring-urged to move it into a position of locking engagement with the other mounting member when the second mounting member is in its seating position, wherein each locking arm is pivotable about a pivot axis for movement into said position of locking engagement and has its mass balanced about said pivot axis.

9. A mounting for mounting an article upon a support comprising:

first and second mounting members which are relatively movable into assembled relationship in which the second mounting member is held in a seating position by the first mounting member, each mounting member having a seating means, the seating means of the two mounting members lying in abutting relationship with the second mounting member immovably registered in a first plane relative to the first mounting member when the second mounting member is in the seating position, the mounting also comprising three spaced mounting member registration projections which are located to provide, in the seating position, contact between the mounting members in a three spaced position and staggered relationship from side to side of the second mounting member to register the second mounting member in a second plane relative to the first mounting member, the registration projections providing wiping action between the mounting members during their movement into assembled relationship; and means for locking the mounting members together with the second mounting member remining in the seating position, wherein the first mounting member has a base and two side flanges extending in opposition to each other from the base to defme with the base a receiving channel for the second mounting member, the base having a seating surface of the seating means facing into the channel, and the flanges having inwardly turned free ends which provide a first pair of guide surfaces which converge in a direction away from an entrance to the channel for receiving the second mounting member, the surfaces of the first pair being inclined, in a lateral direction, towards the seating surface of the first mounting member, the second mounting member having a seating surface of the seating means for abutting contact with the seating surface of the first mounting when the second mounting member is in the seating position, the second mounting member having a second pair of guide surfaces which converge and are inclined correspondingly to the first guide surfaces and each registration projection being provided as part of a respective guide surface whereby during movement of the two mounting members into assembled relationship, each guide surface of one pair moves longitudinally and laterally of a corresponding guide surface of the other pair until, with the second mounting member in its seating position, each of the registration projections on its respective guide surface engages a corresponding guide surface with the inclination of the guide surfaces retaining the abutting contact of the seating means to immovably register the second mounting member in the first plane, and further comprising a pair of locking arms each pivotally mounted upon a respective flange of the first mounting member, the locking arms being spring urged to move through a slot in a respective flange and into another slot provided in the second mounting member so as to hold the second mounting member in its seating position.

10. A mounting for mounting an article upon a support comprising a first mounting member and a second mounting member, one of the first mounting member and the second mounting member for attachment to the article and the other of said first mounting member and the second mounting member for attachment to the support, the mounting members being relatively movable into assembled relationship in which the second mounting member is held in a seating position by the first mounting member, the mounting also including means for urging the second mounting member into its seating position, the urging means comprising a plurality of locking arms which are pivotally connected about pivotal axes to the first mounting member, each locking arm being resiliently moved towards a locking position in locking engagement with opposite sides of the second mounting member, each locking arm having its mass balanced about its pivotal axis.

11. A mounting for mounting a gun upon a support comprising:

a first mounting member and a second mounting member, one of the first mounting member and the second mounting member for attachment to the gun and the other of said first mounting member and the second mounting member for attachment to the support, said first and second mounting members being relatively movable into assembled relationship in which the second mounting member is held in a seating position by the first mounting member, each mounting member having a seating means, the seating means of the two mounting members lying in abutting relationship with the second mounting member immovably registered in a first plane relative to the first mounting member when the second mounting member is in the seating position, the mounting also comprising three spaced mounting member registration projections which are located to provide, in the seating position, contact between the mounting members in a three spaced position and staggered relationship from side to side of the second mounting member to register the second mounting member in a second plane relative to the first mounting member, the registration projections providing wiping action between the mounting members during their movement into assembled relationship; and means for locking the mounting members together with the second mounting member remaining in the seating position, wherein the locking means comprises two locking arms carried by the first mounting member and pivotable about pivot axes, respectively, to engage opposing sides of the second mounting member when the second mounting member is in its seating position, each locking arm being spring-urged to move it into locking engagement within a respective slot defined in the second mounting member to engage a side of the slot and hold the second mounting member in its seating position, and wherein each locking arm has a larch end portion for engaging said side of the slot and the configuration and dimensioning of each latch end portion and its associated slot, and the position of the pivot axis, are such that, when the gun is in use, any component of recoil force tending to move the locking arm outwards from its locking position is less than the effect of friction between the latch end portion and the associated slot side and the action of the spring.

* * * * *